United States Patent
Tokuda (10) Patent No.: US 10,386,466 B2
(45) Date of Patent: Aug. 20, 2019

(54) DISTANCE MEASURING DEVICE AND DISTANCE MEASURING METHOD

(71) Applicant: TOPCON CORPORATION, Itabashi-ku (JP)

(72) Inventor: Yoshikatsu Tokuda, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 319 days.

(21) Appl. No.: 15/452,791

(22) Filed: Mar. 8, 2017

(65) Prior Publication Data

US 2017/0276772 A1   Sep. 28, 2017

(30) Foreign Application Priority Data

Mar. 24, 2016 (JP) ................................. 2016-060662

(51) Int. Cl.
    *G01S 17/10* (2006.01)
    *G01S 7/486* (2006.01)

(52) U.S. Cl.
    CPC ............ *G01S 7/4861* (2013.01); *G01S 17/10* (2013.01)

(58) Field of Classification Search
    CPC ...... G01S 7/486; G01S 7/4861; G01S 7/4865; G01S 7/497; G01S 17/08; G01S 17/10
    See application file for complete search history.

(56) References Cited

U.S. PATENT DOCUMENTS

| 2009/0099813 | A1* | 4/2009 | Dimsdale | G01S 7/4861 702/176 |
| 2011/0310377 | A1* | 12/2011 | Ohishi | G01S 7/497 356/5.01 |
| 2013/0003040 | A1 | 1/2013 | Yoshino et al. | |
| 2016/0116576 | A1* | 4/2016 | Barnes | H04N 5/23222 356/5.01 |

FOREIGN PATENT DOCUMENTS

JP          2013-11558          1/2013

* cited by examiner

*Primary Examiner* — Eric L Bolda
(74) *Attorney, Agent, or Firm* — Xsensus, LLP (57) ABSTRACT

A distance calculating unit includes a first filter that receives a detection signal of reference pulsed light, a second filter that receives a detection signal of measuring pulsed light, an adder circuit that adds the outputs from the two filters together, an A/D converter that receives the output signal from the adder circuit, and a separated-signal calculating unit that analyzes the output from the A/D converter and that generates a first separated signal corresponding to a reference detection signal and a second separated signal corresponding to a measurement detection signal. The distance calculating unit further includes a conversion processing unit that converts the phase of at least one of the two separated signals into a phase of a predetermined frequency, and a distance calculating unit that calculates a distance to an object by using a phase difference between the two separated signals in the predetermined frequency.

9 Claims, 4 Drawing Sheets

Method of roughly measuring pulses

DISTANCE MEASURING DEVICE AND DISTANCE MEASURING METHOD

BACKGROUND OF THE INVENTION

Technical Field

The present invention relates to technology for measuring distances using pulses of light.

Background Art

Techniques for measuring distances by using pulsed light are publicly known. One such technique is disclosed in Japanese Unexamined Patent Application Laid-Open No. 2013-011558. These techniques can be performed with higher distance measurement precision by using pulsed light with a short pulse width. In accordance with these techniques, a phase difference between distance measuring pulsed light that has been reflected from an object, of which distance is to be measured, and reference pulsed light that has propagated through an internal optical path of a device, is detected and is used for calculating the distance.

To process pulsed light that is detected, output of a light receiving element must be converted into a digital signal by an A/D converter. As the pulse width of the pulsed light is decreased, a sampling frequency of the A/D converter must be increased correspondingly. For example, to sample a waveform of pulsed light with a pulse width of 100 picoseconds, an A/D converter that can operate at a sampling frequency of several tens of GHz or higher and that can receive an analog signal with a bandwidth of at least 5 GHz or higher is required. Such an A/D converter is difficult to obtain, and even if such an A/D converter can be obtained, the A/D converter will be expensive and tends to consume large amounts of electrical power and generate large amounts of heat, thereby limiting usage conditions.

To cope with such problems, in accordance with one technique, a detection signal of pulsed light may be converted into a low frequency signal through a BPF (Band Pass Filter) and then may be converted into a digital signal by an A/D converter. In this technique, since a pulsed signal comes to have a damped oscillation waveform after passing through a BPF, a damped oscillation waveform of a distance measuring detection signal and a damped oscillation waveform of a reference detection signal can overlap on a time axis depending on a distance to be measured, and thus, a waveform may not be detected correctly.

To avoid such a problem, in accordance with one method, an external optical path for an optical path of measuring light and an internal optical path for an optical path of reference light may be made switchable, and distance measuring pulsed light that has propagated through the external optical path and reference pulsed light that has propagated through the internal optical path may be sampled at different timings. However, this method requires twice the time for measurement. Moreover, calculation errors can occur due to the time difference. The sampling precision of an A/D converter with a high sampling rate varies slightly at all times due to its heat generation and other effects. Thus, performing A/D conversions at different timings may cause very slight differences between digital data even though the digital data are obtained from the same data. In requiring a distance measurement precision of 2 to 3 mm or less, which is a standard of a typical surveying device, this very small difference may decrease precision. Accordingly, the method of processing the measuring light and the reference light at different timings is unsuitable from the viewpoint of the distance measurement precision.

To avoid such problems, the following method may be performed. In this method, two A/D converters are prepared, and a reference signal and a measuring signal are respectively made to pass through corresponding BPFs by using an RF switch. Then, the reference signal is sampled by one of the two A/D converters, and the measuring signal is sampled by the other A/D converter. However, as is known from the above description in which a very small time difference can cause variation in the calculation error, it is difficult to make characteristics of two A/D converters uniform. Thus, this method can cause decrease in the measurement precision as in the above method.

SUMMARY OF THE INVENTION

The variation in the calculation error can be reduced by performing measurement multiple times and then averaging the measurement results. However, the overall time for the measurement is increased, and the amount of electrical power consumption is increased. In view of these circumstances, an object of the present invention is to provide a technique for measuring distances with high precision without increasing cost.

A first aspect of the present invention provides a distance measuring device including a first band pass filter having a first center frequency, a second band pass filter having a second center frequency that is different from the first center frequency, a mixing circuit, an A/D converter, a separated-signal calculating unit, a converting unit, and a distance calculating unit. The first band pass filter receives a detection signal of reference pulsed light that has propagated through a predetermined optical path, thereby generating a first signal. The second band pass filter receives a detection signal of distance measuring pulsed light that has been emitted to an object and that has been reflected by the object, thereby generating a second signal. The mixing circuit mixes the first signal and the second signal and generates a mixed signal. The A/D converter receives the mixed signal. The separated-signal calculating unit processes output from the A/D converter by FFT analysis after the A/D converter receives the mixed signal, thereby generating a first separated signal corresponding to the first signal and a second separated signal corresponding to the second signal. The converting unit converts a phase of at least one of the first separated signal and the second separated signal into a phase of a predetermined frequency so that the first separated signal and the second separated signal have the same frequency. The distance calculating unit calculates a distance to the object by using a phase difference between the first separated signal and the second separated signal that have the same frequency.

According to a second aspect of the present invention, in the invention according to the first aspect of the present invention, the predetermined frequency may be the first center frequency, and the second separated signal may have a phase $\varphi 2$. In this case, the converting unit may convert the phase $\varphi 2$ of the second separated signal into a phase $\varphi 1'$ of the first center frequency, and the distance calculating unit may calculate the distance to the object by using a phase difference between the first separated signal and the second separated signal of which the phase is converted into the phase $\varphi 1'$.

According to a third aspect of the present invention, in the invention according to the second aspect of the present invention, the converting unit may perform the conversion in accordance with formulas: $f2/f1=m$, $\varphi 1'=\varphi 2/m$, in which "f1" represents the first center frequency, and "f2" represents the second center frequency and is greater than "f1".

According to a fourth aspect of the present invention, in the invention according to the first aspect of the present invention, the predetermined frequency may be the second center frequency, and the first separated signal may have a phase φ1. In this case, the converting unit may convert the phase φ1 of the first separated signal into a phase φ2' of the second center frequency, and the distance calculating unit may calculate the distance to the object by using a phase difference between the first separated signal of which the phase is converted into the phase φ2' and the second separated signal.

According to a fifth aspect of the present invention, in the invention according to the fourth aspect of the present invention, the converting unit may perform the conversion in accordance with formulas: f2/f1=m, φ2'=φ1×m, in which "f1" represents the first center frequency, and "f2" represents the second center frequency and is greater than "f1".

According to a sixth aspect of the present invention, in the invention according to the first aspect of the present invention, the distance measuring device may further include a conversion processing unit that converts the phase of the first separated signal and the phase of the second separated signal into a phase of a comparative frequency, which is different from the first center frequency and the second center frequency. In this case, the distance calculating unit may calculate the distance to the object by using a phase difference between the first separated signal and the second separated signal in the comparative frequency.

A seventh aspect of the present invention provides a distance measuring method including detecting reference pulsed light that has propagated through a predetermined optical path to obtain a first detection signal, and making the first detection signal pass through a first band pass filter that has a first center frequency to obtain a first signal. The method also includes detecting distance measuring pulsed light that has been emitted to an object and that has been reflected by the object to obtain a second detection signal, and making the second detection signal pass through a second band pass filter that has a second center frequency, which is different from the first center frequency, to obtain a second signal. The method further includes mixing the first signal and the second signal to obtain a mixed signal, inputting the mixed signal to an A/D converter, and processing output of the A/D converter by FFT analysis after the A/D converter receives the mixed signal, thereby generating a first separated signal corresponding to the first signal and a second separated signal corresponding to the second signal. The method further includes converting a phase of at least one of the first separated signal and the second separated signal into a phase of a predetermined frequency so that the first separated signal and the second separated signal have the same frequency, and calculating a distance to the object by using a phase difference between the first separated signal and the second separated signal that have the same frequency.

According to the inventions described above, pulsed signals are respectively made to pass through corresponding band pass filters, whereby detection signals are converted into signals having lower frequencies. Thus, even when pulsed light with a short pulse width is used, an A/D converter that operates at a relatively low sampling frequency can be used. Moreover, the reference signal and the measuring signal are input to the A/D converter at the same time, thereby suppressing the increase in the overall processing time and the increase in the calculation error, which can occur in the case of processing signals at different timings or respectively processing signals by corresponding hardware.

An eighth aspect of the present invention provides a distance measuring device including a first band pass filter having a first center frequency, a second band pass filter having a second center frequency that is different from the first center frequency, a mixing circuit, and a distance calculating unit. The first band pass filter receives a detection signal of reference pulsed light that has propagated through a predetermined optical path, thereby generating a first signal. The second band pass filter receives a detection signal of distance measuring pulsed light that has been emitted to an object and that has been reflected by the object, thereby generating a second signal. The mixing circuit mixes the first signal and the second signal and generates a mixed signal. The distance calculating unit calculates a distance to the object based on a waveform of the mixed signal.

According to a ninth aspect of the present invention, in the invention according to the eighth aspect of the present invention, the distance calculating unit may calculate the distance to the object from a phase difference between the mixed signal and a comparative mixed signal. The comparative mixed signal is obtained by mixing a first signal and a second signal. The first signal and the second signal are obtained by inputting a detection signal of reference pulsed light that has a known optical path length, to the first band pass filter and the second band pass filter at the same time.

According to the present invention, a technique for measuring distances with high precision is obtained without increasing cost.

PREFERRED EMBODIMENTS OF THE INVENTION

1. First Embodiment

Structure

Figure 1:
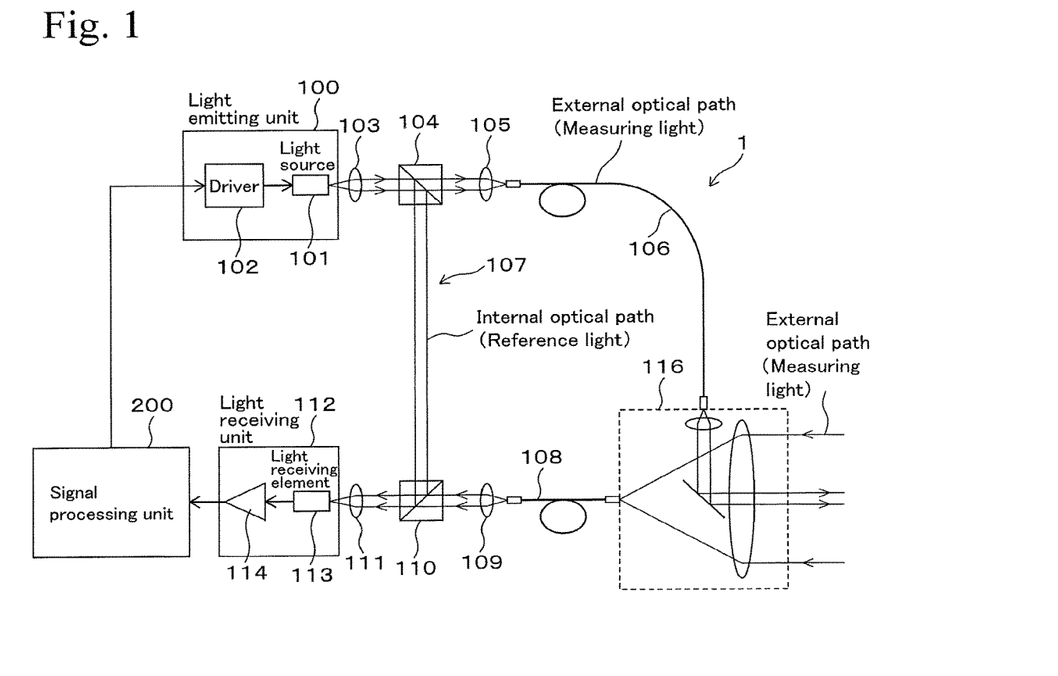
FIG. 1 is a block diagram of an embodiment.

FIG. 1 shows a distance measuring device 1 that measures distances by using a phase difference measurement method. The distance measuring device 1 is configured to be mountable on a table of a tripod or the like. FIG. 1 shows a block diagram of the distance measuring device 1. Although not shown in FIG. 1, the distance measuring device 1 includes a power source, an interface for communicating with an external device, interfaces by which an operator can perform various operations, such as a control panel, a display, and the other units, and hardware and software that are the same as those equipped in a publicly known distance measuring device.

The distance measuring device 1 includes a light emitting unit 100. The light emitting unit 100 has a light source 101, which emits pulsed light to be used as measuring light and reference light, and has a driver 102 for driving the light source 101. Here, the measuring light is light that is emitted to an object to measure a distance to the object, and the reference light is light that is to be compared with the measuring light that is detected, to calculate the distance.

The light source 101 may be formed of a laser diode or the like. As the pulse width of the pulsed light emitted from the light source 101 is decreased, a distance is measured with higher precision. A pulse width in the range of approximately from 100 to 1000 psec may be used, for example. Naturally, another pulse width may also be used. The wavelength of the pulsed light emitted from the light source 101 is, for example, approximately from 600 to 1000 nm, or may be another length. The driver 102 outputs a drive signal for controlling the light emission of the light source 101, to the light source 101 in accordance with a control signal from a controlling unit 214 of a signal processing unit 200, which is described later. The light source 101 is driven by the driver 102 and emits pulsed light at a repetition frequency of 1 MHz. The repetition frequency of the light emission of the light source 101 may be selected from among several hundreds of kilohertz to several megahertz or may be another value, and the repetition frequency can be set depending on the distance to be measured.

The pulsed light that is emitted from the light source 101 passes through a lens 103 and enters a beam splitter 104. The beam splitter 104 transmits a part of the pulsed light from the light source 101 and reflects the other part of the pulsed light in a direction orthogonal to the incident direction of the pulsed light. The beam splitter 104 may be made of a polarizing beam splitter or a non-polarizing beam splitter.

In this embodiment, the pulsed light that passes through the beam splitter 104 is used as measuring pulsed light, and the measuring pulsed light enters an optical fiber 106, which is a part of an external optical path, via a lens 105 and reaches an irradiating optical system 116. The pulsed light that is reflected in a direction of 90 degrees by the beam splitter 104 is led to an internal optical path 107 as reference pulsed light. The measuring pulsed light that is led to the optical fiber 106 is then led to the irradiating optical system 116 for irradiating measuring light (distance measuring light) from the distance measuring device 1 to the outside, and the measuring pulsed light is emitted from the irradiating optical system 116 to an object to be measured. The irradiating optical system 116 also functions as a light receiving optical system. Details of the irradiating optical system 116 are the same as those in a publicly known distance measuring device.

The measuring pulsed light that is emitted from the irradiating optical system 116 hits the object of which distance is to be measured and is reflected by the object. Then, the measuring pulsed light returns to the irradiating optical system 116, which also functions as the light receiving optical system, and is received thereat, and the measuring pulsed light is taken in an optical fiber 108. The measuring pulsed light that is taken in the optical fiber 108 after being reflected by the object enters a beam combiner 110 via a lens 109 and is synthesized with reference pulsed light that has propagated through the internal optical path 107. The beam combiner 110 uses structural components that are the same as those of the beam splitter 104 for synthesizing light beams.

Technically, since there is a difference in the propagation distances of the optical path lengths, the reference pulsed light enters the beam combiner 110 first, and then the measuring pulsed light enters the beam combiner 110. The reference pulsed light and the measuring pulsed light pass through a lens 111 and are taken in a light receiving unit 112. The reference pulsed light and the measuring pulsed light are received by a light receiving element 113, such as a photodiode, and are converted into pulsed detection signals.

The light receiving element 113 outputs the detection signal of the reference pulsed light and the detection signal of the measuring pulsed light. Since the optical path length differs between the reference pulsed light and the measuring pulsed light, the detection signal of the reference pulsed light is output from the light receiving element 113 first, and then the detection signal of the measuring pulsed light is output from the light receiving element 113 at a subsequent time. Hereinafter, the detection signal of the reference pulsed light is called a "reference detection signal", and the detection signal of the measuring pulsed light is called a "measurement detection signal".

Figure 2:
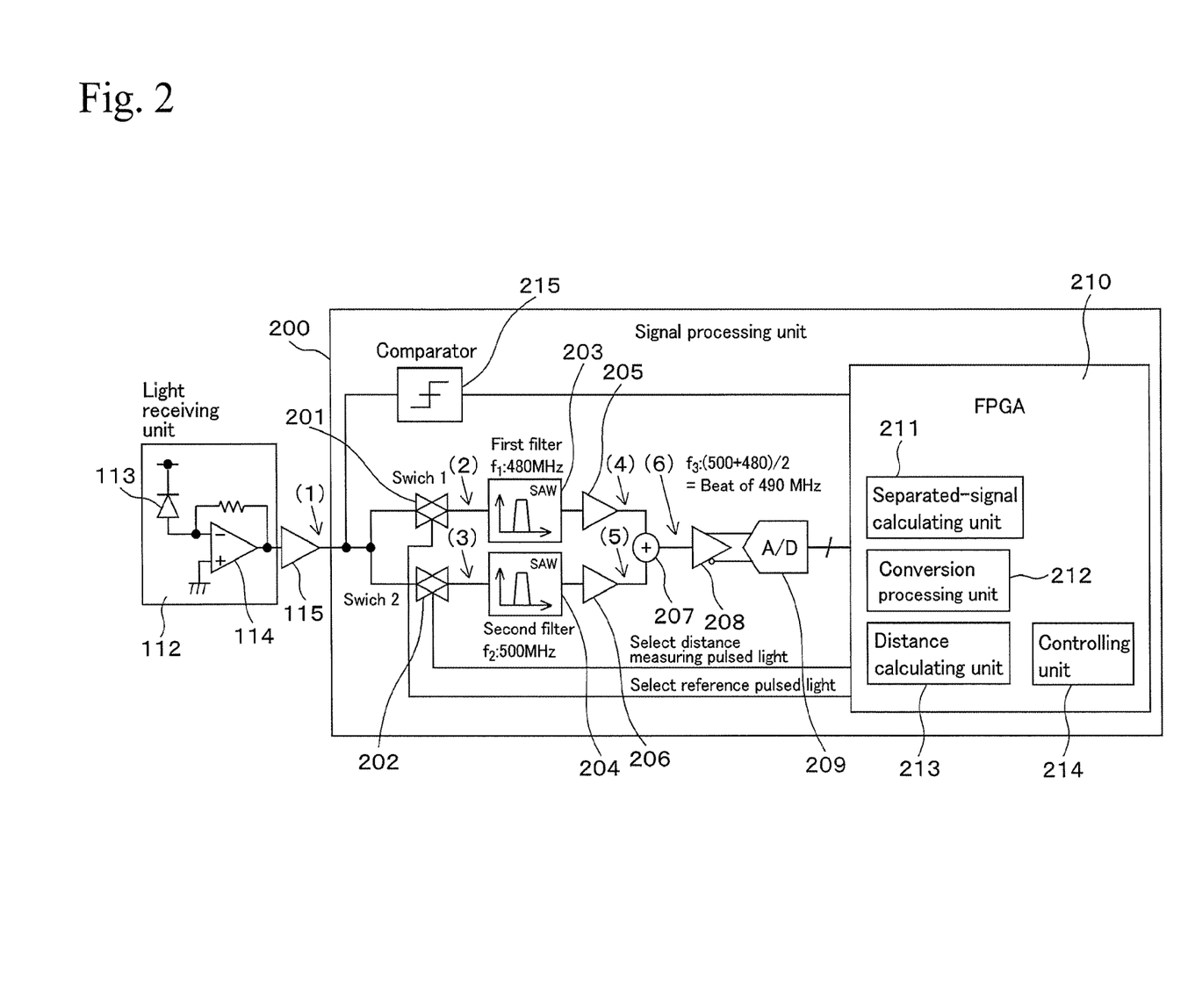
FIG. 2 is a block diagram of an embodiment.

The reference detection signal and the measurement detection signal, after being output from the light receiving element 113, are amplified by an amplifier 114 and are transmitted to a signal processing unit 200, which is a circuit for processing signals, via a buffer amplifier 115 as shown in FIG. 2. Since the reference light and the measuring light are pulsed light, the reference detection signal and the measurement detection signal at an output part of the buffer amplifier 115, which is indicated by the symbol (1) in FIG. 2, also have pulse waveforms.

FIG. 2 shows an outline of the signal processing unit 200. The signal processing unit 200 has RF switches 201 and 202. The RF switch 201 leads the reference detection signal to a first filter 203, and the RF switch 202 leads the measurement detection signal to a second filter 204. The optical path length of the internal optical path is preliminarily known, and thus, the timing when the reference detection signal enters the RF switch 201 is preliminarily calculated. Under these conditions, the RF switch 201 is turned on while the RF switch 202 is turned off at the timing when the reference detection signal enters the RF switch 201, whereas the RF switch 202 is turned on while the RF switch 201 is turned off at the other time. Thus, the reference detection signal is led to the first filter 203, and the measurement detection signal is led to the second filter 204. The RF switches 201 and 202 are controlled by a controlling unit 214, which is described later.

The first filter 203 and the second filter 204 are SAW filters (Surface Acoustic Wave filters). The first filter 203 has a center frequency of 480 MHz and a passband width of plus or minus 150 kHz and exhibits a damping amount of −20 dB or more in an adjacent frequency of plus or minus 1 MHz. The second filter 204 has a center frequency of 500 MHz and a passband width of plus or minus 150 kHz and exhibits a damping amount of −20 dB or more in an adjacent frequency of plus or minus 1 MHz. The center frequencies of the first filter 203 and the second filter 204 are preferably close to each other because a margin of error can be reduced in later calculation processing, but the center frequencies are determined from the viewpoint of the crosstalk and the shoulder characteristics of the filters to be used.

These filters have very high Q values, and therefore, the pulse waveforms are converted into continuous waveforms. Technically, the pulse waveform entering the first filter 203 or the second filter 204 is converted into a damped oscillation waveform after passing therethrough. Nevertheless, in this embodiment, since the repetition frequency of the light emission of the light source 101 is 1 MHz, and the pulse interval on a time axis is 1 μsec, the damped oscillation waveform is not greatly damped during the period of approximately 1 μsec and therefore can be used as a continuous sine waveform. The filters may also be of any other type having characteristics allowing practical use.

The reference detection signal, after passing through the first filter 203, is used as a first signal, and the measurement detection signal after passing through the second filter 204 is used as a second signal. The output of the first filter 203 is input to an adder circuit 207 via a buffer amplifier 205. The output of the second filter 204 is input to the adder circuit 207 via a buffer amplifier 206. The adder circuit 207 adds the first signal and the second signal together. The first signal is the reference detection signal after passing through the first filter 203 having the center frequency of 480 MHz. The second signal is the measurement detection signal after passing through the second filter 204 having the center frequency of 500 MHz. Although the adder circuit 207 is described as a separate circuit in FIG. 2, in this embodiment, the adder circuit 207 is not a dedicated circuit and is formed by using nonlinearity of a transistor in a buffer amplifier 208 in a subsequent stage. The adder circuit 207 may also be formed by using a publicly known frequency mixing circuit using a transistor, a diode, or the like. The reference detection signal of 480 MHz and the measurement detection signal of 500 MHz are mixed by the adder circuit 207, and thus a beat signal of a half of 980 MHz, that is, 490 MHz, is used as an added signal.

The added signal is mathematically described as follows. First, addition of cosine waves is described by the expansion formula of the First Formula based on the formula: $\omega=2\pi f$.

First Formula $$\cos(\omega_1 \cdot t) + \cos(\omega_2 \cdot t) = 2\cos((\omega_1 \cdot t - \omega_2 \cdot t)/2) \cdot \cos((\omega_1 \cdot t + \omega_2 \cdot t)/2)$$
$$= 2\cos((\omega_1 - \omega_2)/2 \cdot t) \cdot \cos((\omega_1 + \omega_2)/2 \cdot t)$$

Here, a difference signal of 2 $\cos((\omega_1-\omega_2)/2 \times t)$ is an envelope of a beat waveform, and a sum signal of $\cos(\omega_1+\omega_2/2 \times t)$ corresponds to a carrier signal of the beat waveform.

Figure 3:
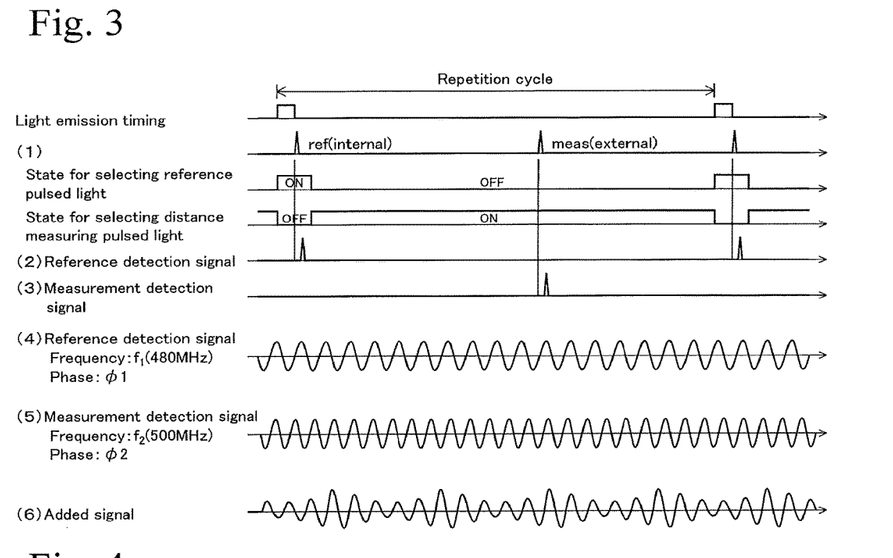
FIG. 3 shows relationships of waveforms in an embodiment.

The added signal of 490 MHz that is obtained by the adder circuit 207 is input to an A/D converter 209 via the buffer amplifier 208. FIG. 3 shows relationships of waveforms at parts indicated by the symbols (1) to (6) in FIG. 2. The relationships are simply described as follows. That is, the reference detection signal in a pulse shape at the part (2) passes through the first filter 203 and is converted into the reference detection signal at the part (4). The measurement detection signal in a pulse shape at the part (3) passes through the second filter 204 and is converted into the measurement detection signal at the part (5). The reference detection signal of 480 MHz at the part (4) and the measurement detection signal of 500 MHz at the part (5) are added together, whereby the added signal of 490 MHz at the part (6) is obtained.

The added signal at the part (6) is converted into a digital signal by the A/D converter 209. The added signal to be sampled by the A/D converter 209 is a continuous signal of 490 MHz, as exemplified by the signal waveform indicated by the symbol (6) in FIG. 3, and therefore, the A/D converter 209 can be one that is relatively inexpensive.

The added signal at the part (6) is digitalized by the A/D converter 209 and is processed by an FPGA (Field Programmable Gate Array) 210. The FPGA 210 is used for constructing a separated-signal calculating unit 211, a conversion processing unit 212, a distance calculating unit 213, and the controlling unit 214. A portion of a processing unit or multiple processing units may be constructed by dedicated hardware such as circuits. Alternatively, a portion of a processing unit or multiple processing units may be constructed by software by using a general purpose CPU. In this embodiment, since high frequency signals are used, the processing units are constructed by an FPGA that can operate at a high processing speed.

The separated-signal calculating unit 211 separates a digital signal corresponding to the reference detection signal of 480 MHz at the part (4) and a digital signal corresponding to the measurement detection signal of 500 MHz at the part (5) from the digitalized added signal of 490 MHz by using an FFT analysis method. This processing is digitally performed such that the digitalized added signal is processed by Fourier expansion, whereby a component of 480 MHz and a component of 500 MHz are extracted.

The conversion processing unit 212 converts the phase of the measurement detection signal of 500 MHz into the phase of 480 MHz, which is the frequency of the reference detection signal. Hereinafter, this processing is described. As is publicly known, in measurement of a distance using the phase difference measurement method, a distance is calculated from a phase difference between a reference signal that has a repetitive waveform and a measuring signal that also has a repetitive waveform. The reference signal corresponds to the reference detection signal at the part (4), and the measuring signal corresponds to the measurement detection signal at the part (5), in this embodiment. The measurement uses the phenomenon in which a phase difference occurs between a reference signal and a measuring signal due to the difference in the propagation distance between reference light and measuring light.

The phases must be compared in a condition in which the frequencies of the reference signal and the measuring signal are the same. The reason for this is because the delay characteristics depend on the frequency, and thus, the phase difference does not correctly correspond to the distance when the phases of signals having different frequencies are compared with each other.

In this embodiment, since two types of frequencies, for example, a frequency of 480 MHz and a frequency of 500 MHz, are necessarily used, the distance cannot be correctly calculated by directly comparing the phases of the reference detection signal at the part (4) and the measurement detection signal at the part (5). Thus, the phase of the measurement detection signal of 500 MHz is converted into the phase of 480 MHz, which is the frequency of the reference detection signal, by the conversion processing unit 212. The precision is maintained even when the conversion is performed because of the following reasons.

Figure 4:
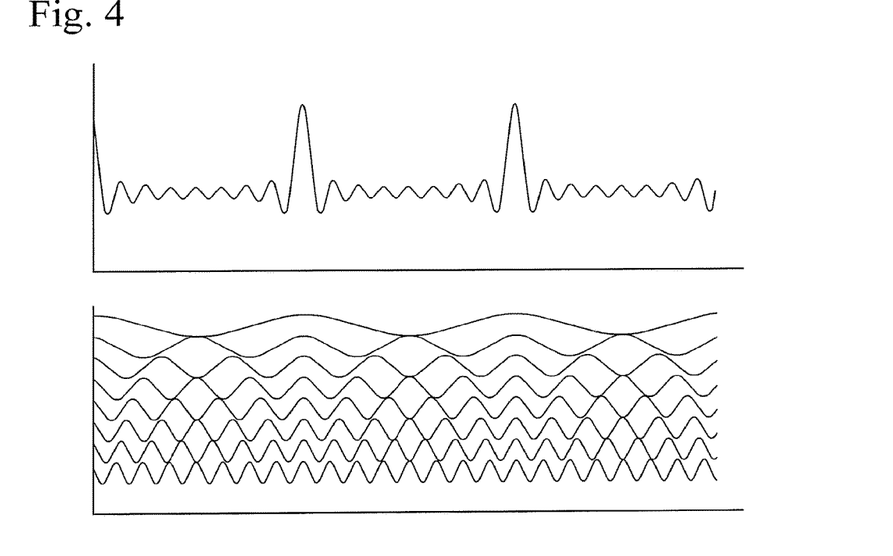
FIG. 4 shows a state in which a pulse waveform is processed by Fourier expansion and is separated into multiple sine waveforms.

FIG. 4 shows a pulse waveform at an upper side, and shows a state in which the pulse waveform at the upper side is separated into multiple sine waveforms by Fourier expansion, at a lower side. When a pulse waveform is processed by Fourier expansion and is separated into multiple sine wave spectra, the group delay characteristics of each of the spectra is constant.

A group delay Tg is obtained by differentiating a phase difference $\varphi$ between an input waveform and an output waveform with an angle frequency $\omega$ and is represented as $Tg=-d\varphi/d\omega$. In the above case, when Tg is constant, the phase difference $\varphi$ is proportional to the angle frequency $\omega$; that is, the phase difference, which occurs after the signals pass through filters or the like, is proportional to the frequency. Thus, when a pulse waveform is processed by Fourier expansion and is separated into multiple sine wave spectra, a phase difference between an input waveform and an output waveform of a spectrum is calculated from a phase difference between an input waveform and an output waveform of another spectrum.

In this embodiment, the pulse waves are made to pass through the BPFs, thereby generating the continuous waves, or more precisely, damped oscillation waveforms, as indicated by the symbols (4) and (5) in FIG. 3. This function can be understood as a phenomenon such that a group delay occurs by making a pulse wave pass through a BPF with a high Q value, whereby an oscillation waveform is output from the BPF. According to this concept, the relationship between the wavelengths, that is, the phase relationship, of the continuous waves indicated by the symbols (4) and (5), exactly corresponds to the phase difference due to the group delays that occur when the pulse waves pass through the filters.

The reference detection signal of 480 MHz and the measurement detection signal of 500 MHz are obtained by making the pulse waveforms, which are obtained from the same pulsed light, pass through the BPFs. The reference detection signal and the measurement detection signal can be respectively understood as a first spectrum waveform and a second spectrum waveform that are obtained in the case of separating a pulse waveform into sine wave spectra as described above. According to the above description, the phase of the first spectrum waveform and the phase of the second spectrum waveform are proportional to the frequency in the case of separating a pulse waveform into sine wave spectra.

Thus, by converting a phase $\varphi 1$ of the reference detection signal of 480 MHz into a phase $\varphi 2'$ of 500 MHz, the phase is increased corresponding to the increased frequency, and the period of the wave is shortened. Specifically, $\varphi 2'=\varphi 1/(480 \text{ MHz}/500 \text{ MHz})$, or $\varphi 2'=(500 \text{ MHz}/480 \text{ MHz})\times\varphi 1$. In other words, when the phase $\varphi 1$ of the reference detection signal of 480 MHz is converted into a phase $\varphi 2'$ of 500 MHz, the phase $\varphi 1$ for 480 MHz is changed into the phase $\varphi 2'$ for 500 MHz, and the value of the phase $\varphi 1'$ becomes greater. In contrast, by converting a phase $\varphi 2$ of the measurement detection signal of 500 MHz into a phase $\varphi 1'$ of 480 MHz, the phase is decreased corresponding to the decreased frequency, and the period of the wave is lengthened. Specifically, $\varphi 1'=\varphi 2/(500 \text{ MHz}/480 \text{ MHz})$, or $\varphi 1'=(480 \text{ MHz}/500 \text{ MHz})\times\varphi 2$.

Such relationships are described by the following general formulas. Assuming that the frequency (480 MHz) and the phase of the reference detection signal are represented by f1 and $\varphi 1$, respectively, the frequency (500 MHz) and the phase of the measurement detection signal are represented by f2 and $\varphi 2$, respectively, and $m=f2/f1$, a phase $\varphi 1_{480}$ of the measurement detection signal in f1 is represented as $\varphi 480=(1/m)\times\varphi 2$. In contrast, a phase $\varphi 2_{500}$ of the reference detection signal in f2 is represented as $\varphi 2_{500}=m\times\varphi 1$.

For example, assuming that the phase of the measurement detection signal of 500 MHz is $\varphi 2=15$ deg, when this phase is converted into a phase of 480 MHz, which is the frequency of the reference detection signal, $\varphi 1_{480}=\varphi 2/(500 \text{ MHz}/480 \text{ MHz})=15 \text{ deg}/(500/480)=14.39999\ldots \text{deg}$. Thus, the phases of the reference detection signal of 480 MHz and the measurement detection signal of 500 MHz can be made to be compared with each other in the same condition. This processing for converting the phase for a frequency into a phase for the other frequency is performed by the conversion processing unit 212.

Although the case of comparing the phases based on 480 MHz, which is the frequency of the reference detection signal, is exemplified above, the phase of the reference detection signal may be converted into a phase of 500 MHz, which is the frequency of the measurement detection signal.

The distance calculating unit 213 compares the phases of the reference detection signal and the measurement detection signal in the same frequency and calculates the distance from the distance measuring device 1 to the object, which has been hit by the measuring light and has reflected the measuring light. The distance calculating unit 213 also performs rough measurement with precision lower than the precision of the precise measurement as shown in FIG. 3. In the rough measurement, the interval between the reference pulsed light and the measuring pulsed light is measured by using a comparator 215, and the distance to the object is calculated from the interval.

Figure 5:
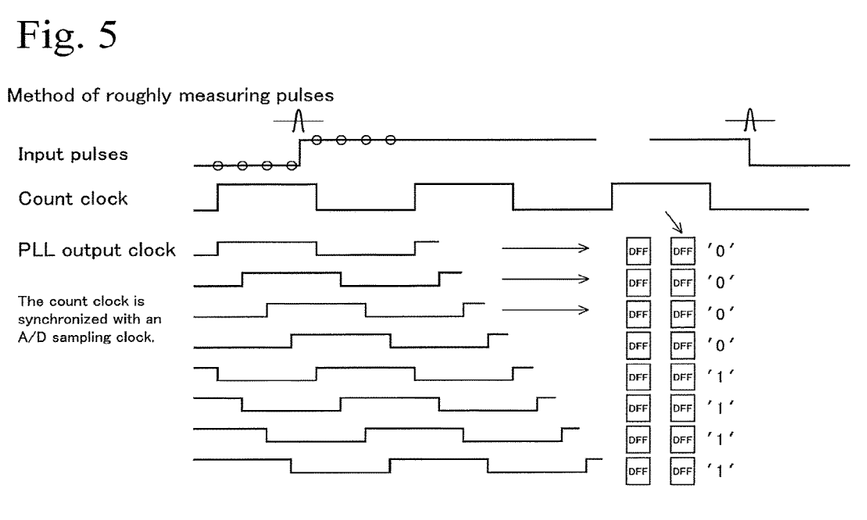
FIG. 5 shows a principle of rough measurement.

Hereinafter, the rough measurement is described. FIG. 5 shows a principle of the rough measurement. The comparator 215 compares a reference potential with an input and outputs "H" when receiving the detection signal of the reference pulsed light from the amplifier 115 and then "L" when receiving the detection signal of the measuring pulsed light from the amplifier 115. The output waveform of the comparator 215 at this time is the input pulse shown in FIG. 5. The input pulse is input to the distance calculating unit 213.

In this embodiment, it is difficult for the clock period of a count clock to be sufficiently short with respect to the period when the input pulse is "H", and therefore, the precision is increased by the following method. The following method may not be necessary when the frequency of the count clock is increased. However, the clock frequency of an A/D converter is limited in the current technology, and moreover, an A/D converter having a high clock frequency is expensive and operates under severe conditions such that its heat generation is great, and the like.

In this embodiment, a PLL output clock that is synchronized with the count clock is used. Here, 8 waveforms are generated by shifting the phase of the PLL output clock by ⅛ by using a latch circuit, and the condition of the input pulse is sampled by respective 8 clocks. Thus, the timing when the input pulse is "H" and the timing when the input pulse is "L" are detected. According to this method, compared with a case of performing sampling by simply using a count clock, the timing when the input pulse is changed from "L" to "H" and the timing when the input pulse is changed from "H" to "L" are detected with higher precision. Naturally, in this method, the margin of error is large compared with that in the processing shown in FIG. 3. According to this processing, the precision of the rough measurement is increased, and the center frequencies of the first filter 203 and the second filter 204 can be set as high as possible.

Actual operation may be performed such that a distance is roughly calculated by the rough measurement first, and then the precise measurement, as shown in FIG. 3, is performed by using the rough distance as an initial value.

The controlling unit 214 functions as a microcomputer that controls the light emission timing of the light emitting unit 100 and that also controls the entire operation of the distance measuring device 1.

As described above, in this embodiment, the distance calculating unit 1 includes the first filter 203 that receives the detection signal of the reference pulsed light, and the second filter 204 that has the center frequency different from that of the first filter 203 and that receives the detection signal of the measuring pulsed light. The distance calculating unit 1 also includes the adder circuit 207 that adds the outputs from the first filter 203 and the second filter 204 together, the A/D converter 209 that receives the output signal from the adder circuit 207, and the separated-signal calculating unit 211 that processes the output from the A/D converter 209 by FFT analysis and that generates the first separated signal corresponding to the reference detection signal and the second separated signal corresponding to the measurement detection signal. The distance calculating unit 1 further includes the conversion processing unit 212 that converts the phase of at least one of the two separated signals into a phase of a predetermined frequency so that the two separated signals have the same frequency, and the distance calculating unit 213 that calculates the distance to the object by using the phase difference between the two separated signals having the same frequency.

Advantages

In FIG. 3, the symbol "ref(internal)" indicates a detection timing of the reference pulsed light, and the symbol "meas (external)" indicates a detection timing of the measuring pulsed light. The detection timings of the two pulsed lights differ because the propagation distances or the flight distances of the two pulsed lights differ from each other. The propagation distance of the reference pulsed light is the length of the internal optical path and is thus known in advance. Accordingly, by obtaining the phase difference or the detection timing difference of the two pulsed lights, the distance to the object is calculated based on the constant speed of light.

However, directly sampling the pulsed light with a short width is difficult, considering cost and techniques. For this reason, in this embodiment, the pulsed detection signal of the reference pulsed light and the pulsed detection signal of the measuring pulsed light are made to pass through the two BPFs that have high Q values and that have different center frequencies. Thus, the reference detection signal of 480 MHz and the measurement detection signal of 500 MHz, as shown in FIG. 3, which have easily sampled frequencies and can be used as continuous waves, are obtained. So as not to generate calculation errors due to the time difference and use of separate components of hardware, the reference detection signal and the measurement detection signal are added together so that an added signal will be obtained, and the added signal is then digitalized by the A/D converter. At this time, the added signal has 490 MHz, and therefore, the added signal is easy to sample with no difficulty in cost and techniques. Moreover, the reference detection signal and the measurement detection signal are processed at the same time, thereby not causing such a problem that occurs in the case of processing them at different timings.

The added signal is separated into the component of 480 MHz and the component of 500 MHz by FFT analysis, whereby the reference detection signal and the measurement detection signal in digital forms are obtained. The frequencies of the reference detection signal and the measurement detection signal are different from each other, and the distance cannot be calculated correctly if the phases of the reference detection signal and the measurement detection signal, as they are, are compared with each other.

Under such a state, the following items are considered.
(1) The reference pulsed light and the measuring pulsed light are obtained by branching one pulsed light.
(2) The reference detection signal and the measurement detection signal are continuous waves that are generated by making the pulse waves pass through the BPFs, and the reference detection signal and the measurement detection signal correspond to components of spectra that can be obtained by processing one pulsed light by Fourier expansion.
(3) Multiple sine waveforms having different frequencies that are obtained by processing a pulse waveform by Fourier expansion have a constant group delay. Thus, by determining the phase of a waveform having a frequency, the phase of the waveform having another frequency can be calculated.

In view of these items, conversion is performed so that the phases of the reference detection signal and the measurement detection signal will be compared in the same frequency. Then, the phase difference between the reference detection signal and the measurement detection signal is detected, and the distance to the object is calculated from this phase difference.

According to this technique, generation of the following problems (A) to (C) is avoided.
(A) The difficulty in cost and in techniques in directly sampling a pulse waveform
(B) The margin of error due to operation performed at different timings
(C) The margin of error due to the characteristic difference between different A/D converters in processing the reference detection signal and the measurement detection signal by the different A/D converters Accordingly, a technique of processing the distance measuring signal and the reference signal at the same time and capable of processing signals with short pulse widths is obtained.

Other Matters

The conversion processing unit 212 may also process the following operations. For example, the phase of the reference detection signal of 480 MHz and the phase of the measurement detection signal of 500 MHz may be converted into a phase of 470 MHz. Then, the phase difference between the reference detection signal and the measurement detection signal may be detected, and the distance to the object may be calculated.

In another example, the phase of the reference detection signal of 480 MHz and the phase of the measurement detection signal of 500 MHz may be converted into a phase of 490 MHz. In yet another example, the phase of the reference detection signal of 480 MHz and the phase of the measurement detection signal of 500 MHz may be converted into a phase of 510 MHz.

As the frequencies of the reference detection signal and the measurement detection signal are increased, the distance measurement precision tends to be increased. However, the increase in the frequencies can lead to exceeding of the performance of the device for the increased frequencies and can cause increase in the cost. Accordingly, the frequencies of the reference detection signal and the measurement detection signal are preferably high within an allowable range. Naturally, the frequencies of the reference detection signal and the measurement detection signal may be made lower than those in this embodiment to decrease the cost at the expense of the precision. In another case, the frequency of the measurement detection signal may be made lower than the frequency of the reference detection signal.

As an alternative to the added signal that is obtained by adding the reference detection signal and the measurement detection signal together, a difference signal between the reference detection signal and the measurement detection signal may be used. In this case, the difference signal, which is represented by $2\cos((\omega_1-\omega_2)/2\times t)$ in the First Formula, is extracted by using a low pass filter that passes a frequency of $(\omega_1-\omega_2)/2$. As an alternative to directly mixing the reference detection signal and the measurement detection signal, they may be mixed together after at least one of the reference detection signal and the measurement detection signal is converted into a signal of another frequency.

2. Second Embodiment

According to the First Embodiment, the added signal is processed by FFT analysis and is separated into the reference detection signal and the measurement detection signal, and then the phase difference between the reference detection signal and the measurement detection signal is detected and is used for calculating the distance to the object. This method is one of methods for calculating distances to objects based on added signals. The added signal contains information relating to the phase difference between the reference detection signal and the measurement detection signal.

For example, a first added signal may be obtained by adding a first reference detection signal and a first measurement detection signal together, and a second added signal may be obtained by adding a second reference detection signal and a second measurement detection signal together. At this time, if the phase difference between the first reference detection signal and the first measurement detection signal differs from the phase difference between the second reference detection signal and the second measurement detection signal, the waveforms of the first added signal and the second added signal differ from each other. This can be clearly known from the First Formula. Accordingly, the added signal contains information relating to the phase difference between the reference detection signal and the measurement detection signal. Thus, the information relating to the phase difference between the reference detection signal and the measurement detection signal can be detected from the added signal, and the distance to the object can be calculated from the added signal.

Hereinafter, an exemplary method for calculating a distance to an object without separating an added signal into a reference detection signal and a measurement detection signal is described. In this case, the following processing is performed by the distance calculating unit 214. The processing for obtaining the added signal is the same as in the case of the First Embodiment. The added signal is used as an added signal for measurement. After the added signal for measurement is obtained, the light source is made to emit light again, and a detection signal of the reference pulsed light, that is, the reference detection signal is obtained. Then, the RF switches 201 and 202 are turned on, and the reference detection signal is made to pass through the first filter 203 and the second filter 204. The outputs of the first filter 203 and the second filter 204 are added together, whereby a reference added signal is obtained. The reference added signal is based on the pulsed light that has passed through the internal optical path of which the distance is preliminarily known.

Next, the added signal for measurement and the reference added signal are compared with each other, whereby a phase difference therebetween is obtained. This phase difference is proportional to the difference between the distance to the object and the distance of the internal optical path. The proportional relationship is preliminarily obtained. Thus, the distance to the object is calculated from the proportional relationship and the phase difference.

What is claimed is:

1. A distance measuring device comprising:
    a first band pass filter that has a first center frequency and that receives a detection signal of reference pulsed light, which has propagated through a predetermined optical path, thereby generating a first signal;
    a second band pass filter that has a second center frequency different from the first center frequency and that receives a detection signal of distance measuring pulsed light, which has been emitted to an object and has been reflected by the object, thereby generating a second signal;
    a mixing circuit that mixes the first signal and the second signal and generates a mixed signal;
    an A/D converter that receives the mixed signal;
    a processor or circuit configured to perform as a separated-signal calculating unit that processes output from the A/D converter by FFT analysis after the A/D converter receives the mixed signal, thereby generating a first separated signal corresponding to the first signal and a second separated signal corresponding to the second signal;
    the processor or circuit further configured to perform as a converting unit that converts a phase of at least one of the first separated signal and the second separated signal into a phase of a predetermined frequency so that the first separated signal and the second separated signal have the same frequency; and
    the processor or circuit further configured to perform as a distance calculating unit that calculates a distance to the object by using a phase difference between the first separated signal and the second separated signal that have the same frequency.

2. The distance measuring device according to claim 1, wherein the predetermined frequency is the first center frequency, the second separated signal has a phase $\varphi 2$, the converting unit converts the phase $\varphi 2$ of the second separated signal into a phase $\varphi 1'$ of the first center frequency, and the distance calculating unit calculates the distance to the object by using a phase difference between the first separated signal and the second separated signal of which the phase is converted into the phase $\varphi 1'$.

3. The distance measuring device according to claim 2, wherein the converting unit performs the conversion in accordance with formulas: $f2/f1=m$, $\varphi 1'=\varphi 2/m$, in which "f1" represents the first center frequency, and "f2" represents the second center frequency and is greater than "f1".

4. The distance measuring device according to claim 1, wherein the predetermined frequency is the second center frequency, the first separated signal has a phase $\varphi 1$, the converting unit converts the phase $\varphi 1$ of the first separated signal into a phase $\varphi 2'$ of the second center frequency, and the distance calculating unit calculates the distance to the object by using a phase difference between the first separated signal of which the phase is converted into the phase $\varphi 2'$ and the second separated signal.

5. The distance measuring device according to claim 4, wherein the converting unit performs the conversion in accordance with formulas: $f2/f1=m$, $\varphi 2'=\varphi 1 \times m$, in which "f1" represents the first center frequency, and "f2" represents the second center frequency and is greater than "f1".

6. The distance measuring device according to claim 1, wherein the processor or circuit is further configured to perform as
    a conversion processing unit that converts the phase of the first separated signal and the phase of the second separated signal into a phase of a comparative frequency, which is different from the first center frequency and the second center frequency, and
    the distance calculating unit calculates the distance to the object by using a phase difference between the first separated signal and the second separated signal in the comparative frequency.

7. A distance measuring method comprising:

detecting reference pulsed light that has propagated through a predetermined optical path to obtain a first detection signal;

making the first detection signal pass through a first band pass filter that has a first center frequency to obtain a first signal;

detecting distance measuring pulsed light that has been emitted to an object and that has been reflected by the object to obtain a second detection signal;

making the second detection signal pass through a second band pass filter that has a second center frequency, which is different from the first center frequency, to obtain a second signal;

mixing the first signal and the second signal to obtain a mixed signal;

inputting the mixed signal to an A/D converter;

processing output of the A/D converter by FFT analysis after the A/D converter receives the mixed signal, thereby generating a first separated signal corresponding to the first signal and a second separated signal corresponding to the second signal;

converting a phase of at least one of the first separated signal and the second separated signal into a phase of a predetermined frequency so that the first separated signal and the second separated signal have the same frequency; and calculating a distance to the object by using a phase difference between the first separated signal and the second separated signal that have the same frequency.

8. A distance measuring device comprising:

a first band pass filter that has a first center frequency and that receives a detection signal of reference pulsed light, which has propagated through a predetermined optical path, thereby generating a first signal;

a second band pass filter that has a second center frequency different from the first center frequency and that receives a detection signal of distance measuring pulsed light, which has been emitted to an object and has been reflected by the object, thereby generating a second signal;

a mixing circuit that mixes the first signal and the second signal and generates a mixed signal; and a processor or circuit configured to perform as a distance calculating unit that calculates a distance to the object based on the mixed signal.

9. The distance measuring device according to claim 8, wherein the distance calculating unit calculates the distance to the object from a phase difference between the mixed signal and a comparative mixed signal that is obtained by mixing a first signal and a second signal, and the first signal and the second signal are obtained by inputting a detection signal of reference pulsed light, which has a known optical path length, to the first band pass filter and the second band pass filter at the same time.

\* \* \* \* \*